(12) United States Patent
Korber et al.

(10) Patent No.: US 11,566,382 B2
(45) Date of Patent: Jan. 31, 2023

(54) PROCEDURE FOR CONTROLLING A GUIDE SYSTEM OF A RAILWAY CONSTRUCTION MACHINE, ASSOCIATED METHOD AND ASSOCIATED GUIDE SYSTEM

(71) Applicant: MATISA MATERIEL INDUSTRIEL SA, Crissier (CH)

(72) Inventors: Nicolas Korber, Brenles (CH); Nicolino Demarco, Renens (CH); Serge Wenger, Echallens (CH)

(73) Assignee: MATISA Materiel Industriel S.A., Crissier (CH)

( * ) Notice: Subject to any disclaimer, the term of this patent is extended or adjusted under 35 U.S.C. 154(b) by 543 days.

(21) Appl. No.: 16/617,755

(22) PCT Filed: May 18, 2018

(86) PCT No.: PCT/EP2018/063172
§ 371 (c)(1),
(2) Date: Mar. 18, 2020

(87) PCT Pub. No.: WO2018/219699
PCT Pub. Date: Dec. 6, 2018

(65) Prior Publication Data
US 2021/0010207 A1  Jan. 14, 2021

(30) Foreign Application Priority Data
May 29, 2017 (FR) ...................................... 1754679

(51) Int. Cl.
*E01B 35/00* (2006.01)
*B61L 25/02* (2006.01)
(Continued)

(52) U.S. Cl.
CPC ............ *E01B 35/00* (2013.01); *B61L 25/025* (2013.01); *B61L 25/026* (2013.01); *E01B 27/16* (2013.01); *G01C 7/04* (2013.01)

(58) Field of Classification Search
CPC ......... G01C 15/00; G01C 7/04; B61L 25/025; B61L 25/026; E01B 27/16; E01B 35/00
(Continued)

(56) References Cited

U.S. PATENT DOCUMENTS 5,204,731 A   4/1993 Tanaka et al.
7,979,995 B2  7/2011 Theurer et al.
(Continued)

FOREIGN PATENT DOCUMENTS

| AT | 519263 A4 | * | 5/2018 | ............... B61K 9/08 |
| CA | 2431070 C | * | 9/2008 | ............. A61G 5/061 |

(Continued)

*Primary Examiner* — Atul Trivedi
(74) *Attorney, Agent, or Firm* — Laurence A. Greenberg; Werner H. Stemer; Ralph E. Locher

(57) ABSTRACT

In order to control a measuring system with a tacheometer mounted on a carrier trolley circulating on a railway track under construction and a target fastened to a railway construction machine, the carrier trolley is circulated on the railway track in a working direction from a starting position to an arrival position in the vicinity of a topographic arrival singularity. The carrier trolley is immobilized and an observation of the topographic arrival singularity is made. Then, with the railway construction machine having been brought into the starting position, an observation of the target is made. Finally, the coordinates of the arrival position of the carrier trolley are calculated as a function of the measurements made, of additional data relating to the starting position, and of positioning data of the topographic arrival singularity and data relating to a theoretical line of the track.

20 Claims, 3 Drawing Sheets

(51) Int. Cl.
  *E01B 27/16* (2006.01)
  *G01C 7/04* (2006.01)
(58) Field of Classification Search
  USPC ......................................................... 702/150
  See application file for complete search history.

(56) References Cited

U.S. PATENT DOCUMENTS

| | | | | |
|---|---|---|---|---|
| 2002/0166248 | A1* | 11/2002 | Carr | G01B 11/24 33/287 |
| 2003/0097235 | A1 | 5/2003 | Theurer et al. | |
| 2007/0213926 | A1* | 9/2007 | Jager | E01B 35/00 701/33.1 |
| 2008/0033605 | A1* | 2/2008 | Daum | B61L 27/16 701/19 |
| 2012/0240809 | A1* | 9/2012 | Aguirre Fernandez | E01B 33/02 104/3 |
| 2015/0345943 | A1* | 12/2015 | Daniel | G01C 3/08 356/4.08 |
| 2017/0368413 | A1* | 12/2017 | Shavit | A63B 24/0075 |
| 2018/0273060 | A1* | 9/2018 | Corbin | G01P 15/14 |

FOREIGN PATENT DOCUMENTS

| | | | | |
|---|---|---|---|---|
| EP | 0605848 A1 | * | 7/1994 | ............ B61L 3/00 |
| EP | 1418273 A1 | | 5/2004 | |
| FR | 2655417 A1 | | 12/1990 | |
| FR | 2677679 A1 | | 6/1992 | |
| FR | 3037085 A1 | * | 12/2016 | ............ E01B 35/06 |
| FR | 3110534 A1 | * | 11/2021 | |
| GB | 2257189 A | | 6/1993 | |
| GB | 2536746 A | * | 9/2016 | ............ B61K 9/08 |
| JP | H10266107 A | | 10/1998 | |
| JP | 2003072553 A | * | 3/2003 | |
| JP | 2006131219 A | | 5/2006 | |
| JP | 2019074428 A | * | 5/2019 | |
| RU | 2551637 C2 | * | 5/2015 | |
| WO | 2009015728 A1 | | 2/2009 | |
| WO | WO-2019154720 A1 | * | 8/2019 | ............ B61K 9/08 |

* cited by examiner

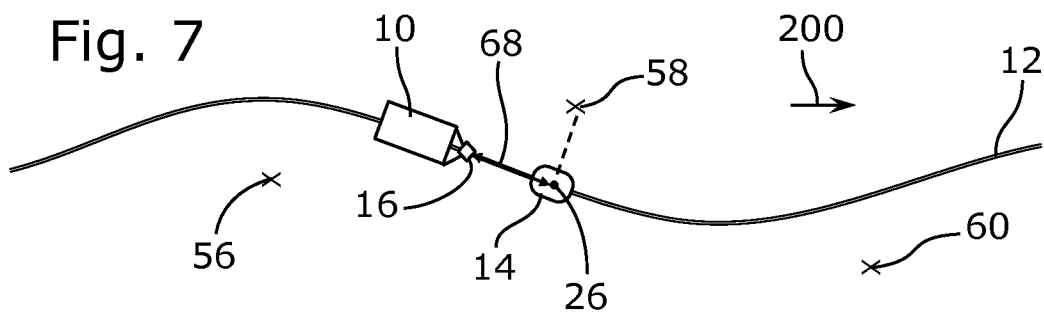
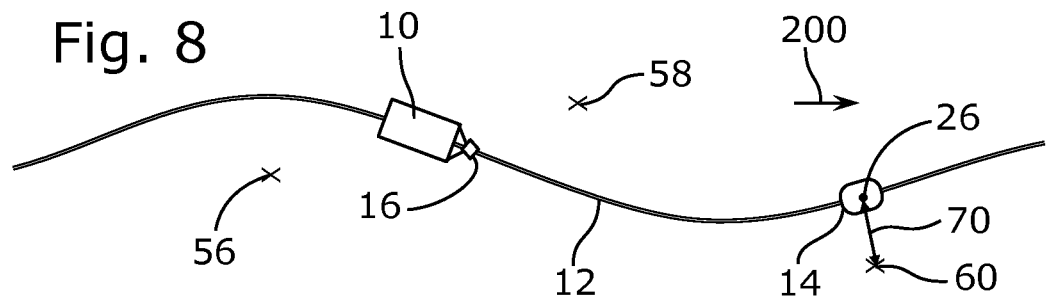
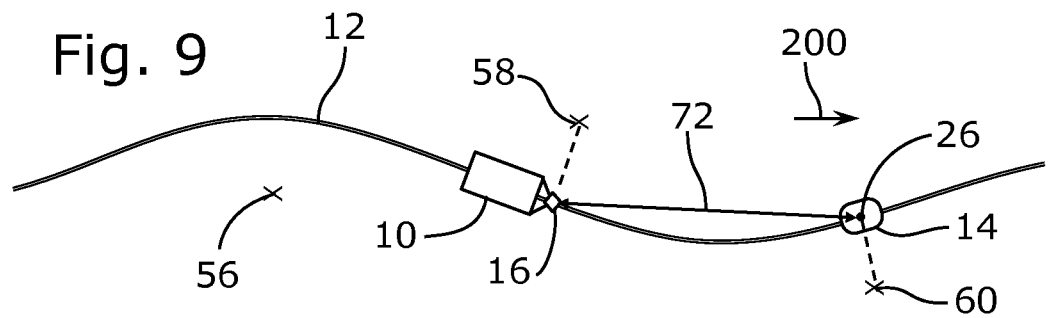
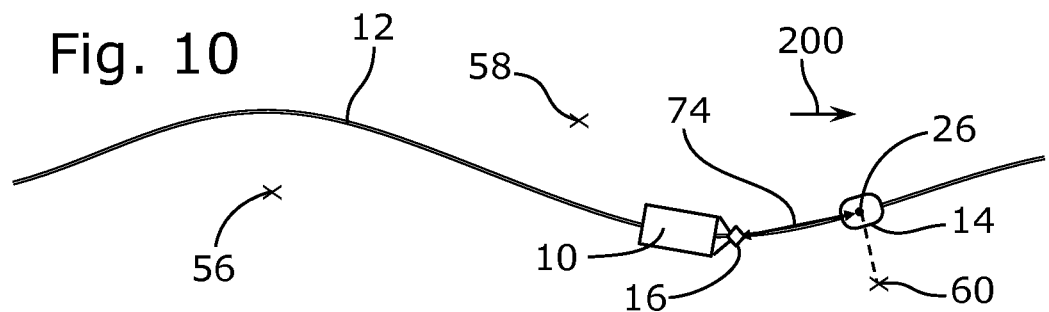

PROCEDURE FOR CONTROLLING A GUIDE SYSTEM OF A RAILWAY CONSTRUCTION MACHINE, ASSOCIATED METHOD AND ASSOCIATED GUIDE SYSTEM

TECHNICAL FIELD OF THE INVENTION

The invention relates to the guidance of railroad works machines such as tie tampers or relaying trains, and more specifically to the setting of a guidance system of a railroad works machine.

STATE OF THE PRIOR ART

To ensure the guidance of railroad works machines, it is routine practice to implement guidance systems using a satellite global positioning system (GPS) trolley and a laser guide, as illustrated in the document US2003097235.

There is however a need to allow a guidance of a railroad works machine with neither geopositioned geometry nor absolute reference points.

SUMMARY OF THE INVENTION

The invention aims to remedy the shortcomings of the state of the art and to propose a guidance method and a system which can be implemented in real time on a work site without excessive downtime of the railroad works machine, which do not involve recourse to a global location system, and which do not require the operator to have topographic knowledge.

For this, there is proposed, according to a first aspect of the invention, a procedure for setting a measurement system comprising a tacheometer mounted on a trolley circulating on a railroad track undergoing works, a target fixed onto a railroad works machine, a set of data on a theoretical line of the railroad track, and a set of data on positioning of noteworthy topographic singularities, characterized in that:
  the trolley is made to circulate on the railroad track in a working direction from a starting position to a position of arrival in proximity to a topographic singularity of arrival indexed in the set of data on positioning of noteworthy topographic singularities;
  the trolley is immobilized relative to the railroad track in the position of arrival;
  the trolley being immobilized in the position of arrival, a sighting is made of the topographic singularity of arrival using the tacheometer, and at least a distance, an azimuth angle and an elevation angle characteristic of the relative positioning of the tacheometer relative to the topographic singularity of arrival are measured,
  the railroad works machine having been brought into the starting position, a sighting is made of the target, using the tacheometer, and at least a distance, an azimuth angle and an elevation angle characteristic of the relative positioning of the tacheometer relative to the target are measured,
  coordinates of the position of arrival of the trolley in a floating reference frame are calculated, as a function of the measurements performed in the sighting of the topographic singularity of arrival and the sighting of the target, of additional data relating to the starting position, as well as of data on positioning of the topographic singularity of arrival read from the set of data on positioning of noteworthy topographic singularities, and of data relating to the theoretical line of the track read from the set of data on the theoretical line of the track, then the coordinates of the position of arrival of the trolley in the floating reference frame are stored.

The procedure makes it possible to determine the positioning of the tacheometer without reference to a global positioning system, in a floating reference frame which is that of the set of data on topographic singularities.

In practice, the tacheometer can comprise a theodolite coupled to a rangefinder, for example with infrared or laser sighting. The instruments have electronic outputs linked to an electronic reading, storage and transmission circuit. The tacheometer is preferably provided with a motor drive allowing it to follow a moving target, and constitutes what is commonly called a total station. The reflecting target can be a mirror or, preferably, a reflectorized marker, for example a tetrahedral reflecting prism.

The operations of movement and of immobilization can be carried out by an operator, if necessary assisted by a motorized assistance. They can also be at least partially automated. Likewise, the sighting operations can be performed by an operator, or performed by a robot incorporated in the tacheometer.

The immobilizing of the trolley can be performed using brakes bearing on the wheels of the trolley or directly on the rails, or by the deployment of feet pressing on the rails or the ballast, or even using a clamp engaging with one of the rails. According to one embodiment, the action of immobilization of the trolley relative to the railroad track includes a vertical setting of a reference axis of the tacheometer. This setting can be done by modifying the trim of the trolley relative to the track, or by modifying the trim of the pivoting axis relative to the trolley. Preferably, this trim setting is automatic, inasmuch as it is performed by actuators as a function of signals delivered by one or more sensors.

The set of data on the theoretical line of the track can, if necessary, be made up of coordinates expressed in an absolute topographic reference frame. Alternatively, and preferentially, the set of data on the theoretical line of the track contains data analytically defining the theoretical geometry of the track, preferably as a succession of segments, the segments preferably comprising straight and circular arc segments. In practice, the data make it possible to define the line of the railroad track unequivocally, by analytical geometric. The data contain, for each straight segment, a length, and for each circular arc, a radius of curvature and a curvilinear length.

The set of data on positioning of the noteworthy topographic singularities can, if necessary, be made up of coordinates of the topographic singularities in an absolute topographic reference frame. Alternatively, and preferentially, the set of data on positioning of the noteworthy topographic singularities contains data on relative positioning of the noteworthy topographic singularities relative to the theoretical geometry of the track, preferably including a curvilinear abscissa measured along the theoretical line of the track, a distance measured at right angles to the theoretical line of the track and a height relative to the theoretical line of the track. In practice, the data make it possible to unequivocally define the relative positioning of each indexed topographic singularity relative to the railroad track. The distance datum can notably be assigned a sign indicating on what side of the track the topographic singularity is located.

According to a particular implementation of the procedure, the procedure is as follows:
  before making the trolley circulate from the starting position to the position of arrival, the trolley is immobilized relative to the railroad track in the starting position;

the trolley being immobilized in the starting position, the tacheometer is used to perform a sighting of a starting topographic singularity indexed in the set of data on positioning of noteworthy topographic singularities, and at least a distance, and an elevation angle characteristic of the relative positioning of the tacheometer relative to the starting topographic singularity are measured, the additional data relating to the starting position comprising the measurements performed in the sighting of the starting topographic singularity.

This modality of implementation will be particularly useful for acquiring additional data relating to the starting position, in particular for a first iteration of the procedure.

According to another implementation of the procedure, the trolley in the starting position has coordinates that are known and stored in the floating reference frame, which constitute the additional data relating to the starting position. This variant will be particularly suited to subsequent iterations of the procedure. When, before the railroad works machine is in the starting position, the position of the railroad works machine is known, provision is preferably made to bring the railroad works machine into the starting position by making it work and by calculating its trajectory by interpolation. In this phase, the railroad works machine works and advances without the tacheometer being involved. For this interpolation, the knowledge that has been previously acquired on the starting position of the trolley and on the position of the railroad works machine at the start of the guidance sequence by interpolation is used. The interruptions to the progress of the railroad works machine are thus minimized.

In practice, the noteworthy topographic singularities include track equipment, notably overhead contact line posts.

According to another aspect of the invention, the latter deals with a method for guidance of a railroad works machine using a measurement system comprising a tacheometer mounted on a trolley circulating on a railroad track undergoing works, a target fixed to the railroad works machine, a set of data on a theoretical line of the railroad track, and a set of data on positioning of noteworthy topographic singularities. This method comprises several iterations, each iteration implementing at least one procedure for setting the measurement system as described previously, followed, while the trolley remains immobilized in the position of arrival, by a procedure for guidance of the railroad works machine by the guidance system. The setting procedure makes it possible to establish a local reference frame of the tacheometer, used throughout the guidance procedure to guide the railroad works machine, so that its work conforms to the desired line of the railroad track, as is defined by the set of data on a theoretical line of the railroad track.

According to one embodiment, the method comprises an initial iteration comprising a procedure for setting the measurement system followed, while the trolley remains immobilized in the position of arrival, by the procedure for guidance of the railroad works machine by the guidance system. The setting procedure of the initial iteration comprises notably the following steps:
  before making the trolley circulate from the starting position to the position of arrival, the trolley is immobilized relative to the railroad track in the starting position;
  the trolley being immobilized in the starting position, the tacheometer is used to perform a sighting of a starting topographic singularity indexed in the set of data on positioning of noteworthy topographic singularities, and at least a distance, and an elevation angle characteristic of the relative positioning of the tacheometer relative to the starting topographic singularity are measured, the additional data relating to the starting position comprising the measurements performed in the sighting of the starting topographic singularity.

Preferably, the initial iteration is followed by iterations each comprising a procedure for setting the measurement system according to which the trolley in the starting position has coordinates that are known and stored in the floating reference frame, which constitute the additional data relating to the starting position, this setting procedure being followed, while the trolley remains immobilized in the position of arrival, by the procedure for guidance of the railroad works machine by the guidance system.

The procedure for guidance of the railroad works machine can be carried out in accordance with the practice in the state of the art. Preferably, the procedure for guidance of the railroad works machine by the guidance system comprises the following actions:
  using the tacheometer, successive sightings of the target are performed when the railroad works machine advances while working on the railroad track in the working direction from the starting position to the trolley, and, on each of the successive sightings, at least a distance, an azimuth angle and an elevation angle characteristic of the relative positioning of the target relative to the tacheometer are measured,
  current coordinates of a current position of the target in the floating reference frame are calculated as a function of the measurements performed and of the coordinates of the position of arrival;
  the positioning of the railroad works machine is piloted as a function of the current coordinates of the current position of the target.

In practice, the procedure for guidance of the railroad works machine by the guidance system is stopped when, during the phase of guidance of the railroad works machine, the railroad works machine which is advancing on the railroad track in the working direction reaches a predetermined position relative to the tacheometer, then the iterative procedure is reiterated.

According to one embodiment, the measurement actions include a bidirectional wireless transmission of data between the tacheometer and an onboard computer of the railroad works machine.

According to another aspect of the invention, the latter deals with a system for guidance of a railroad works machine on a railroad track undergoing works, the railroad works machine having a front portion, the guidance system comprising:
  a trolley capable of rolling on the railroad track undergoing works in front of the railroad works machine, the trolley being provided with an immobilizing mechanism capable of immobilizing the trolley relative to the railroad track undergoing works;
  a reflecting target, capable of being secured to the front portion of the railroad car;
  a tacheometer, supported by the trolley and capable of measuring at least an azimuth angle, an elevation angle and a distance between the tacheometer and the target;
  a control device for implementing the previously described setting procedure of the guidance method described previously, the control device comprising:
    a set of data on positioning of noteworthy topographic singularities situated along the railroad track;

a set of data on a theoretical line of the railroad track;
computation means communicating with the tacheometer and having access to the set of data on positioning of noteworthy topographic singularities, and to the set of data on a theoretical line of the railroad track.

Preferably, the set of data on the theoretical line of the track contains data analytically defining the theoretical geometry of the track, preferably as a succession of segments, the segments preferably comprising straight and circular arc segments.

Preferably, the set of data on positioning of the noteworthy topographic singularities contains data on relative positioning of the noteworthy topographic singularities relative to the theoretical geometry of the track, preferably including a curvilinear abscissa measured along the theoretical line of the track, a distance measured at right angles to the theoretical line of the track and a height relative to the theoretical line of the track.

BRIEF DESCRIPTION OF THE FIGURES

Other features and advantages of the invention will become apparent on reading the following description, with reference to the attached figures, which illustrate:

FIG. 7, a procedure for guidance of a railroad works machine following the setting procedure of FIGS. 3 to 6;

FIGS. 8 and 9, different successive steps of another setting procedure according to the invention, for setting the guidance system of FIG. 1, following the guidance procedure of FIG. 7;

FIG. 10, a procedure for guidance of a railroad works machine following the setting procedure of FIGS. 8 and 9.

For greater clarity, the elements that are identical or similar are identified by identical reference signs throughout the figures.

DETAILED DESCRIPTION OF EMBODIMENTS

Figure 1:
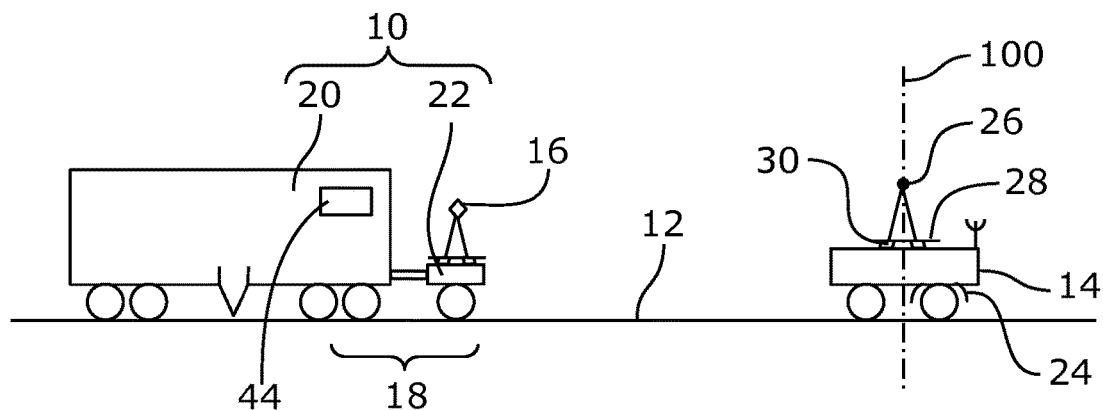
FIG. 1, some elements of a system for guidance of a railroad works machine according to the invention.

Referring to FIG. 1, the guidance system according to the invention makes it possible to guide a railroad works machine 10, for example a tie tamper, working on an existing railroad track 12, and the intervention of which must make it possible, among other things, to straighten the trajectory of the track 12 so that the latter conforms better to a given theoretical line, or, assuming that the existing track 12 conforms to the theoretical line, to ensure that the passing of the railroad works machine does not adversely affect the existing alignment.

The guidance system implements a trolley 14 capable of rolling on the railroad track 12 in front of the railroad works machine 10, and a reflecting target 16 secured to a front portion 18 of the railroad car 10. This front portion can be secured to the main frame 20 of the railroad works machine 10, or consist of a target trolley 22 pushed by the front main car 20 of the railroad works machine 10.

The trolley 14 is provided with an immobilizing mechanism 24 capable of immobilizing the trolley 14 relative to the track 12, which can consist of a braking device acting on one or more wheels of the trolley, or of one or more shoes coming into contact with the rails, even feet coming into contact against the rails or the ballast, or a clamp engaging with one of the rails.

The trolley 14 supports a tacheometer 26, which is mounted to pivot about a pivoting axis 100 at right angles to a substantially horizontal platform 28 of the trolley. The tacheometer 26 is a device that is known per se, which makes it possible, directly or indirectly, to measure azimuth and elevation angles as well as the distance between the tacheometer 26 and a reflecting target of the type of the reflecting target 16.

The trolley 14 is equipped with means 30 that make it possible to ensure the horizontal position of the platform 28 and the vertical position of the pivoting axis 100. These means 30 can for example be incorporated in a suspension of the trolley or in the immobilizing means 24. Alternatively, the vertical position of the pivoting axis 100 of the tacheometer 26 can be obtained by means that make it possible to tilt the pivoting axis 100 relative to the platform 28, so as to ensure the vertical position of the axis when the platform is not horizontal. If necessary, the means 30 making it possible to ensure the vertical position of the pivoting axis 100 of the tacheometer 26 can be motorized and piloted on the basis of measurement signals delivered by an inclinometer mounted on the tacheometer 26 or the platform 28.

Figure 2:
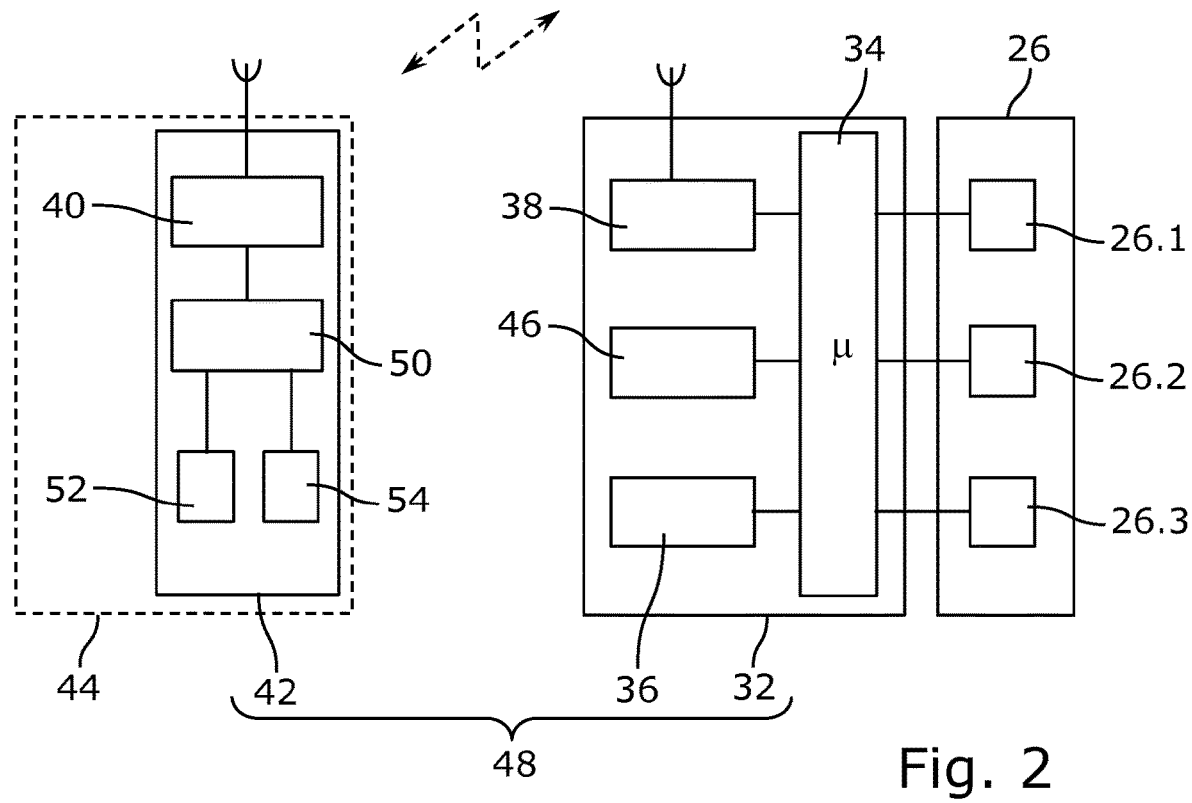
FIG. 2, other elements of the system for guidance of a railroad works machine of FIG. 1.

As illustrated in FIG. 2, the tacheometer 26 is linked to an electronic control circuit 32 comprising, for example, a microcontroller 34 capable of executing a measurement program to read azimuth angle, elevation angle and distance signals, emitted by corresponding sensors 26.1, 26.2, 26.3 of the tacheometer 26, of reading data or commands input on a human-machine interface 36 such as a touchscreen, of transmitting and receiving data via a telecommunication circuit 38 wirelessly with a communication circuit 40 of an onboard computer 42 of a driving position 44 of the railroad works machine 10, and of writing or reading data stored on a local or remote memory 46.

The onboard computer 42 and the electronic control circuit 32 together constitute a control device 48 comprising computation means 50 which have access to a set of data 52 on a theoretical line of the railroad track 12, and to a set of data 54 on positioning of noteworthy topographic singularities situated along the railroad track 12. These noteworthy topographic singularities can notably consist of track or track-side equipment, notably overhead contact line posts, each equipped with a reflectorized marker. The memories storing the sets of data 52, 54 and the computation means 50 have here been illustrated as components of the onboard computer 42, but their physical location has no impact on the implementation of the method according to the invention, and can be distributed in any way between the electronic control circuit, the onboard computer, even remote elements, provided that communication means exist for linking the components together.

Figure 3:
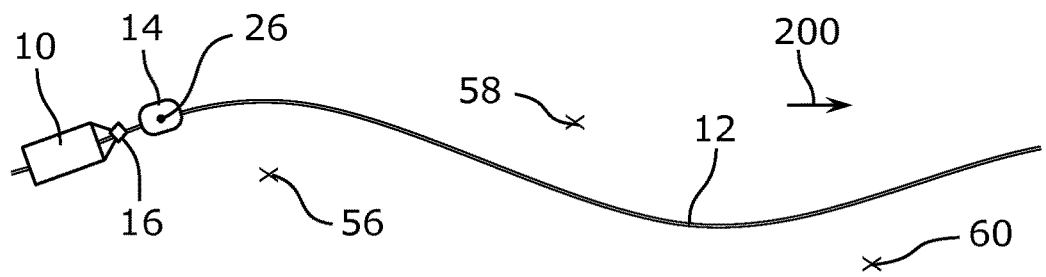
FIGS. 3 to 6, different successive steps of a setting procedure according to the invention, for setting the guidance system of FIG. 1.

In FIGS. 3 to 6, a procedure for initial setting of the measurement system is illustrated, starting from the assumption that the positions of the trolley 14 and of the railroad works machine 10 are not known precisely in FIG. 3, but that some topographic singularities 56, 58, 60 alongside the railroad track 12 are indexed in the set of data on noteworthy topographic singularities 54.

Figure 4:
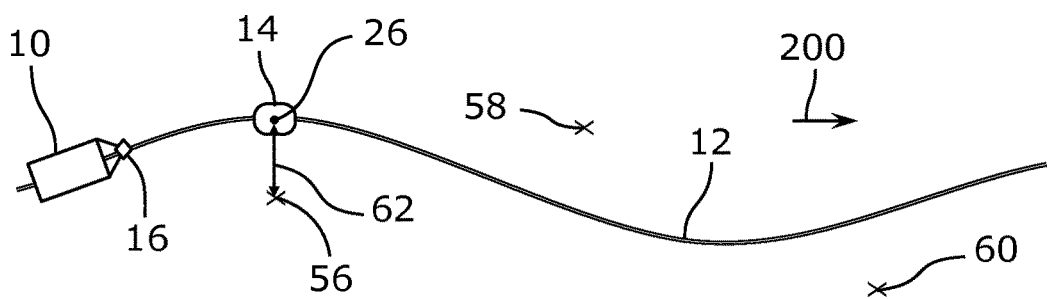

As illustrated in FIG. 4, the trolley 14 is first positioned in proximity to an initial topographic singularity 56 indexed in the set of data on noteworthy topographic singularities 54. The trolley 14 is immobilized relative to the railroad track in the initial position, using the immobilizing mechanism 24. The trolley 14 being immobilized in the initial position of FIG. 4, a sighting 62 of the initial topographic singularity 56 is performed using the tacheometer 26, and at least a distance and an elevation angle characteristic of the relative positioning of the tacheometer 26 relative to the initial topographic singularity 56 are measured.

These measurements are in themselves insufficient to totally determine the coordinates of the initial position of the tacheometer 26, but they make it possible to define a theoretical circle, centered on the initial topographic singularity 56, where the tacheometer 26 is located in the initial position.

Figure 5:
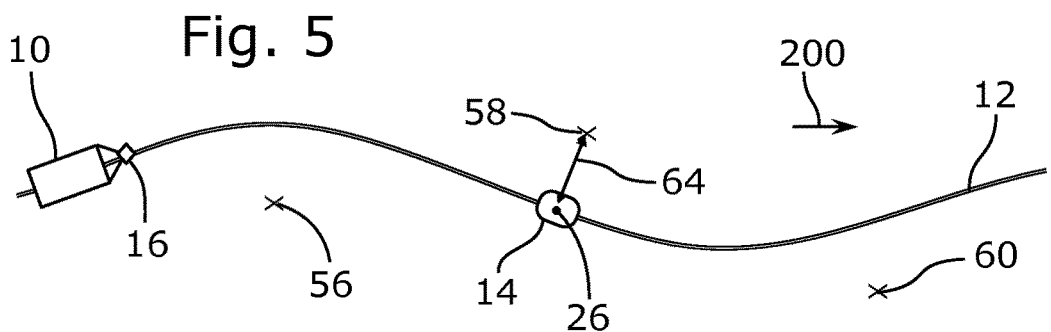

Secondly, as illustrated in FIG. 5, the trolley 14 is moved on the railroad track to a first topographic singularity of arrival 58 indexed in the set of data on noteworthy topographic singularities 54. As previously, the trolley 14 is immobilized relative to the railroad track 10. The trolley 14 being immobilized in the first position of arrival, a sighting 64 of the first topographic singularity of arrival 58 is performed using the tacheometer 26, and at least a distance, an azimuth angle and an elevation angle characteristic of the relative positioning of the tacheometer 26 relative to the first topographic singularity of arrival 58 are measured.

Like the preceding ones, these measurements are in themselves insufficient to totally determine the coordinates of the first position of arrival of the tacheometer 26, but make it possible to define a theoretical circle, centered on the first topographic singularity of arrival, where the tacheometer is located in the first position of arrival.

Figure 6:
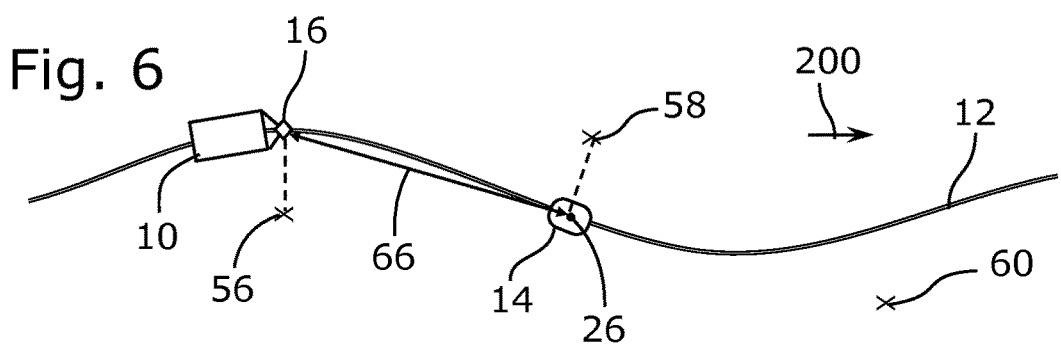

Thirdly, while the trolley remains immobilized in the first position of arrival, the railroad works machine 10 is moved to bring the target 16 into the initial position, as illustrated in FIG. 6, and, using the tacheometer 26 in the first position of arrival, a sighting 66 is performed of the target 16 positioned on the railroad works machine 10, in the initial position. At least a distance, an azimuth angle and an elevation angle characteristic of the relative positioning of the target 16 in the initial position relative to the tacheometer 26 in the first position of arrival are measured.

These three series of three measurements, allied with the reading of the data relating to the positioning of the initial topographic singularity 56 and of the first topographic singularity of arrival 58, make it possible to calculate two sets of possible positions for the initial position and the first position of arrival. A reading, in the set of data 52 on the theoretical line of the railroad track, makes it possible to determine and retain that of the two sets of possible positions which is the closest to the theoretical line of the railroad track. There are thus obtained, from the three measurements performed with the tacheometer 26, analytically and without recourse to a global geolocation system, the coordinates of the initial position and of the first position of arrival in the three-dimensional floating reference frame defined by the set of data on noteworthy topographic singularities and the set of data on the theoretical geometric of the track. These coordinates of the initial position and of the first position of arrival can for example be expressed by a curvilinear abscissa along the theoretical line of the railroad track and by a deviation (in height and laterally) relative to the theoretical line of the railroad track.

It should be noted that it is possible to reverse the order of the sightings 64, 66 performed from the first position of arrival, and to begin, for example, with the sighting 66 of the target 16, provided that the railroad works machine 10 is in the initial position. It will also be noted that the method has been explained assuming that it is possible to position the target 16 in the initial position previously occupied by the tacheometer 26. However, in practice, if it is found that the positioning of the target 16 on the railroad works machine 10 induces a systematic deviation relative to the initial positioning of the tacheometer 26, it will be possible to take account of this known systematic deviation by refining the computation algorithm. Moreover, the method has been explained without taking account of the approximations in the measurements. However, the person skilled in the art will be able to introduce a recognition of these uncertainties into the calculations.

Having completed the initial setting procedure making it possible to determine the initial position and the first position of arrival, it is possible to begin a first a procedure for guidance of the railroad works machine 10 by the guidance system, the trolley 14 being immobilized in the first position of arrival. To do this, and as illustrated in FIG. 7, successive sightings 68 of the target 16 are performed, using the tacheometer 26, when the railroad works machine 10 is advancing while working on the railroad track in the working direction 200 from the initial position to the trolley 14, and, in each of the successive sightings 68, at least a distance, an azimuth angle and an elevation angle characteristic of the relative current positioning of the target relative to the tacheometer are measured. This phase is preferably automated and involves, as is known, motors incorporated in the tacheometer 26, which allow the latter to track the movements of the target 16. Current coordinates of a current position of the target 16 in the floating reference frame are calculated as a function of the measurements performed and of the coordinates of the first position of arrival. These coordinates of the current position of the target 16 are preferably expressed in the floating reference frame by a curvilinear abscissa along the theoretical line of the railroad track and by a deviation (in height and laterally) relative to the theoretical line of the railroad track. Finally, the positioning of the railroad works machine 10 is piloted as a function of the current coordinates of the current position of the target 16.

When the railroad works machine 10 reaches a predetermined position, for example a predetermined minimum distance relative to the tacheometer, the phase of guidance of the railroad works machine 10 by the guidance system is stopped, and a new guidance iteration is begun.

This new iteration begins, like each of the subsequent ones, with a phase of movement and of positioning of the tacheometer 26, from the position of arrival of the preceding iteration, taken as new starting position, and illustrated in FIG. 7, to a new position of arrival, as illustrated in FIG. 8, in proximity to a new topographic singularity 60 indexed in the set of data on noteworthy topographic singularities 54. As previously, the trolley 14 is immobilized relative to the railroad track 10. The trolley 14 being blocked in the new position of arrival, a sighting 70 of the new topographic singularity of arrival 60 is performed using the tacheometer 26, and at least a distance, an azimuth angle and an elevation angle characteristic of the relative positioning of the tacheometer 26 relative to the new topographic singularity of arrival 60 are measured.

Simultaneously, it is possible to have the railroad works machine work on the railroad track up to the new starting position of the tacheometer, facing the new starting topographic singularity 58, by calculating a deviation between real track and theoretical track by interpolation. When the railroad works machine reaches the new starting position, it is stopped, as illustrated in FIG. 9.

Then, while the trolley remains immobilized in the new position of arrival, there is performed, using the tacheometer 26 in the new position of arrival, a sighting 72 of the target 16 positioned on the railroad works machine 10, in the new starting position, as illustrated in FIG. 9. At least a distance, an azimuth angle and an elevation angle characteristic of the relative positioning of the target 16 in the new starting position relative to the tacheometer 26 in the new position of arrival are measured.

These two series of measurements, it is possible to deduce, if necessary with the additional knowledge of the theoretical trajectory of the railroad track given by the set of data 52 on the theoretical line of the track, the coordinates of the new position of arrival, it being recalled that the position of the target 16 in the new starting position is known, since it coincides with the position of arrival of the tacheometer in the preceding iteration. It is then possible to begin a new procedure for guidance of the railroad works machine, with successive sightings 74 of the target 16 while the railroad works machine 10 advances while working toward the trolley 14.

The setting and guidance procedures described require a transmission of data in real time between the tacheometer 26 and the onboard computer 42 of the driving position 44 of the railroad works machine 10. Consequently, the calculations to be performed can be distributed in different ways between the tacheometer 26 and the onboard computer 42. It is for example possible to minimize the calculations at the tacheometer 26 level, by providing for all the accesses to the set of data 54 on noteworthy topographic singularities to be performed by the onboard computer 42, and for the calculations making it possible to determine the position of the tacheometer 26 during the phase of positioning of the trolley 14 or the position of the target 16 during the guidance phase, to be performed by the onboard computer 42 of the railroad works machine 10. Conversely, it is possible to envisage locating all or part of these calculations at the tacheometer 26 level, to make the latter a universal standalone device.

If necessary, the microcontroller 34 has access to a set of data on morphology of the noteworthy topographic singularities, for example a set of data on photographs or pictograms of the topographic singularities, and is able to broadcast these graphic representations to a screen of the human-machine interface 36 of the electronic control circuit 32 of the tacheometer 26.

Preferably, in all the starting positions or positions of arrival of the trolley 14, efforts are made to position the latter so that the sightings 62, 64, 70, of the topographic singularities 56, 58, 60, are at right angles to the railroad track 12. In practice, the measurement of the azimuth angle can be avoided for the topographic singularities 56, 58, 60, if this positioning is performed with care.

Naturally, the examples represented in the figures and discussed hereinabove are given purely in an illustrative and nonlimiting manner. Provision is explicitly made for it to be possible to combine the different embodiments illustrated with one another to propose others thereof.

It is stressed that all the features, as emerge for a person skilled in the art from the present description, from the drawings and from the attached claims, even if they have not been described concretely other than in relation to other determined features, both individually and in any combinations, can be combined with other features or groups of features disclosed here, provided that that has not been expressly excluded or that the technical circumstances render such combinations impossible or pointless.

The invention claimed is:

1. A method for operating a measurement system having a tacheometer mounted on a trolley movable on a railroad track undergoing work, a target mounted on a railroad works machine, a set of data on a theoretical line of the railroad track, and a set of data on positions of noteworthy topographic singularities, the method comprising:
    moving the trolley on the railroad track independently from the railroad works machine in a working direction from a starting position to an arrival position in proximity to a topographic singularity of arrival indexed in the set of data on positions of noteworthy topographic singularities;
    immobilizing the trolley relative to the railroad track in the arrival position;
    with the trolley being immobilized at the arrival position, sighting the topographic singularity of arrival using the tacheometer and measuring at least a distance, an azimuth angle and an elevation angle characteristic of a relative positioning of the tacheometer relative to the topographic singularity of arrival;
    with the railroad works machine having been brought into the starting position and the trolley being immobilized at the arrival position, sighting the target using the tacheometer and measuring at least a distance, an azimuth angle and an elevation angle characteristic of a relative positioning of the tacheometer relative to the target;
    calculating coordinates of the arrival position of the trolley in a floating reference frame, as a function of the measurements performed in the sighting of the topographic singularity of arrival and in the sighting of the target, of additional data relating to the starting position, and of data on positioning of the topographic singularity of arrival read from the set of data on positions of noteworthy topographic singularities, and of data relating to the theoretical line of the track read from the set of data on the theoretical line of the track, and subsequently storing coordinates of the arrival position of the trolley in the floating reference frame.

2. The method according to claim 1, wherein the step of immobilizing the trolley relative to the railroad track includes a vertical setting of a reference axis of the tacheometer.

3. The method according to claim 1, wherein the set of data on the theoretical line of the track contains data analytically defining a theoretical geometry of the track.

4. The method according to claim 3, wherein the theoretical geometry of the track is defined as a succession of segments being straight and circular arc segments.

5. The method according to claim 1, wherein the set of data on positions of the noteworthy topographic singularities contains data on relative positioning of the noteworthy topographic singularities relative to the theoretical geometry of the track, including a curvilinear abscissa measured along the theoretical line of the track, a distance measured at right angles to the theoretical line of the track, and a height relative to the theoretical line of the track.

6. The method according to claim 1, comprising:
    prior to moving the trolley from the starting position to the arrival position, immobilizing the trolley relative to the railroad track in the starting position;
    with the trolley being immobilized in the starting position, using the tacheometer to perform a sighting of a starting topographic singularity indexed in the set of data on positions of noteworthy topographic singularities, and measuring at least a distance, and an elevation angle characteristic of the relative positioning of the tacheometer relative to the starting topographic singularity;

wherein the additional data relating to the starting position comprises the measurements performed in the sighting of the starting topographic singularity.

7. The method according to claim 1, wherein the trolley in the starting position has coordinates that are known and stored in the floating reference frame, which constitute the additional data relating to the starting position.

8. The method according to claim 7, wherein the position of the railroad works machine is known before the railroad works machine is brought into the starting position, and bringing the railroad works machine into the starting position by working and by calculating its trajectory by interpolation.

9. The method according to claim 1, wherein the noteworthy topographic singularities comprise track equipment, including overhead contact line posts.

10. A system for guiding a railroad works machine on a railroad track undergoing works, the railroad works machine having a forward portion, the guidance system comprising:
    a trolley capable of rolling on the railroad track undergoing works in front of the railroad works machine independently from the railroad works machine, the trolley including an immobilizing mechanism configured to immobilize the trolley relative to the railroad track undergoing works;
    a reflecting target to be mounted to the forward portion of the railroad car works machine;
    a tacheometer, supported by said trolley and configured to measure at least an azimuth angle, an elevation angle, and a distance between the tacheometer and said target;
    a control device for performing the method according to claim 1 or the guidance method according to claim 9, the control device comprising:
    a set of data on positions of noteworthy topographic singularities along the railroad track;
    a set of data on a theoretical line of the railroad track; and
    computation means communicating with the tacheometer and having access to the set of data on the positions of noteworthy topographic singularities, and to the set of data on a theoretical line of the railroad track.

11. The guidance system according to claim 10, wherein the set of data on the theoretical line of the track contains data analytically defining the theoretical geometry of the track.

12. The guidance system according to claim 11, wherein the theoretical geometry of the track is defined as a succession of segments being straight and circular arc segments.

13. A method of guiding a railroad works machine, the method comprising:
    providing a measurement system with a tacheometer mounted on a trolley movable on a railroad track undergoing work independently from the railroad works machine, a target fixed to the railroad works machine, a set of data on a theoretical line of the railroad track, and a set of data on positions of noteworthy topographic singularities;
    guiding the railroad works machine with a plurality of iterations, each iteration implementing the method according to claim 1, and subsequently, with the trolley immobilized in the arrival position, guiding the railroad works machine with the guidance system.

14. The guidance method according to claim 13, which comprises conducting an initial iteration with a method according to claim 6 for setting the measurement system, followed, while the trolley remains immobilized in the arrival position, by guiding the railroad works machine with the guidance system.

15. The guidance method according to claim 14, which comprises following the initial iteration by iterations each comprising a process for setting a measurement system having a tacheometer mounted on a trolley movable on a railroad track undergoing work, a target mounted on a railroad works machine, a set of data on a theoretical line of the railroad track, and a set of data on positions of noteworthy topographic singularities, by:
    moving the trolley on the railroad track independently from the railroad works machine in a working direction from a starting position to an arrival position in proximity to a topographic singularity of arrival indexed in the set of data on positions of noteworthy topographic singularities;
    immobilizing the trolley relative to the railroad track in the arrival position;
    with the trolley being immobilized at the arrival position, sighting the topographic singularity of arrival using the tacheometer and measuring at least a distance, an azimuth angle and an elevation angle characteristic of a relative positioning of the tacheometer relative to the topographic singularity of arrival:
    with the railroad works machine having been brought into the starting position and the trolley being immobilized at the arrival position, sighting the target using the tacheometer and measuring at least a distance, an azimuth angle and an elevation angle characteristic of a relative positioning of the tacheometer relative to the target;
    calculating coordinates of the arrival position of the trolley in a floating reference frame, as a function of the measurements performed in the sighting of the topographic singularity of arrival and in the sighting of the target, of additional data relating to the starting position, and of data on positioning of the topographic singularity of arrival read from the set of data on positions of noteworthy topographic singularities, and of data relating to the theoretical line of the track read from the set of data on the theoretical line of the track, and subsequently storing coordinates of the arrival position of the trolley in the floating reference frame; and
    wherein the trolley in the starting position has coordinates that are known and stored in the floating reference frame, which constitute the additional data relating to the starting position;
    followed, while the trolley remains immobilized in the arrival position, by guiding the railroad works machine with the guidance system.

16. The guidance method according to claim 13, which comprises guiding the railroad works machine with the guidance system by performing the following steps:
    with the tacheometer, performing successive sightings of the target when the railroad works machine advances while working on the railroad track in the working direction from the starting position to the trolley, and, on each successive sighting, measuring at least a distance, an azimuth angle, and an elevation angle characteristic of a relative positioning of the target relative to the tacheometer;
    calculating current coordinates of a current position of the target in the floating reference frame in dependence on the measurements and the coordinates of the arrival position; and
    piloting the positioning of the railroad works machine in dependence on the current coordinates of the current position of the target.

17. The guidance method according to claim 16, which comprises stopping the guidance of the railroad works machine by the guidance system when, during the guiding of the railroad works machine, the railroad works machine which is advancing on the railroad track in the working direction reaches a predetermined position relative to the tacheometer, and subsequently reiterating with the iterative procedure.

18. The guidance method according to claim 1, wherein the measuring steps include a bidirectional wireless transmission of data between the tacheometer and an onboard computer of the railroad works machine.

19. The setting system according to claim 18, wherein the set of data on the positions of noteworthy topographic singularities contains data on relative positioning of the noteworthy topographic singularities relative to the theoretical geometry of the track.

20. The setting system according to claim 19, wherein the data on relative positioning of the noteworthy topographic singularities relative to the theoretical geometry of the track include a curvilinear abscissa measured along the theoretical line of the track, a distance measured at right angles to the theoretical line of the track, and a height relative to the theoretical line of the track.

* * * * *